Sept. 22, 1964
M. BLAUSTEIN ETAL
3,150,222
MOLDING THREADED ARTICLES
Filed May 16, 1961
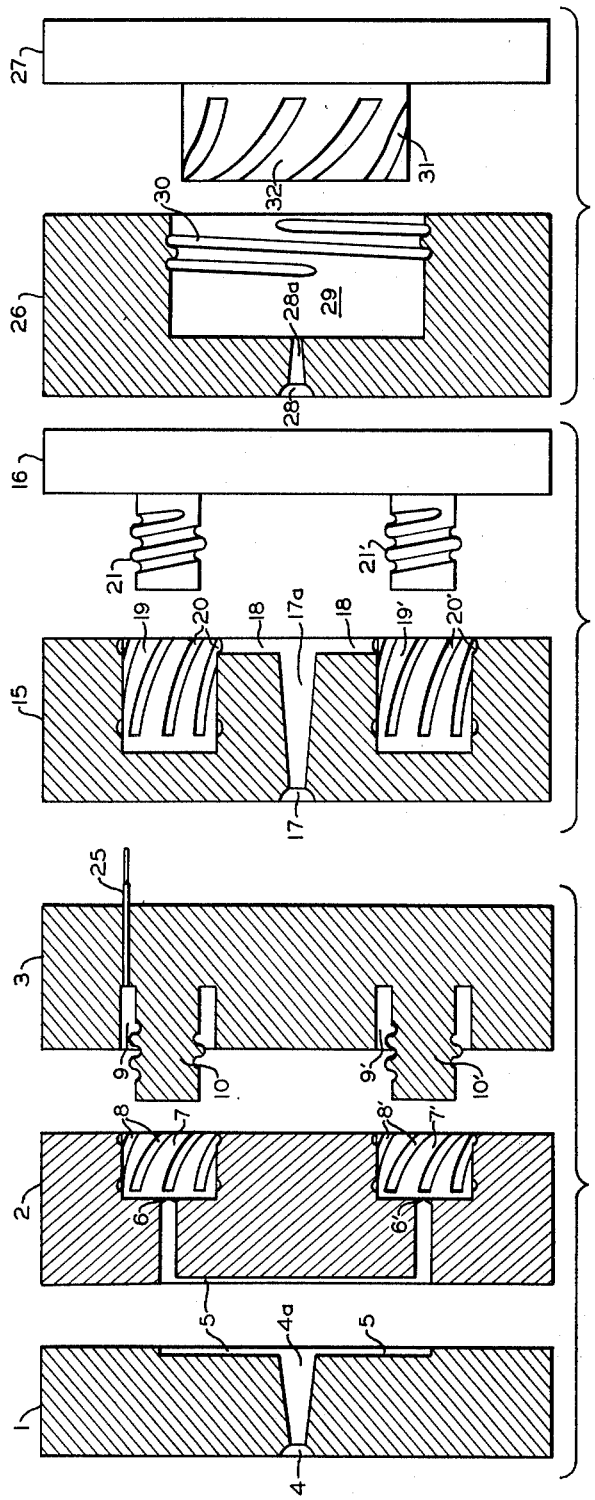
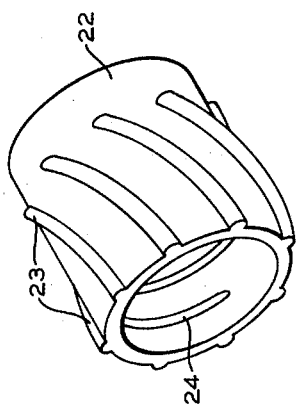
INVENTORS.
MILTON BLAUSTEIN
J. N. SCOTT, JR.
BY
*Hudson & Young*
ATTORNEYS United States Patent Office 3,150,222
Patented Sept. 22, 1964

3,150,222
MOLDING THREADED ARTICLES
Milton Blaustein and John N. Scott, Jr., both of Bartlesville, Okla., assignors to Phillips Petroleum Company, a corporation of Delaware
Filed May 16, 1961, Ser. No. 110,436
8 Claims. (Cl. 264—318)

This invention relates to method and apparatus for molding threaded plastic articles, and to the article thus produced. In one respect, this invention relates to method and apparatus for facilitating removal of a threaded plastic article from its mold by effecting by the parting of the mold a partial unthreading of the article from the mold. In another aspect, the invention relates to a method and apparatus for causing partial unscrewing of a molded threaded plastic item from the threaded portion of the mold. In another aspect, the invention relates to method and apparatus for molding a threaded articles which comprises molding as a surface of the article a helical rib, the longitudinal axis of the helix corresponding with the longitudinal axis of the thread; parting the boundaries of the molding zone so as to cause rotation of the article with respect to the boundaries. In yet another aspect, this invention relates to method and apparatus for molding a threaded articles which comprises provided a molding zone defined by an inner and an outer surface, one of the surfaces having a threaded area thereon and the other of the surfaces having a helical deformation thereon, the longitudinal axis of the helix corresponding with the longitudinal axis of the threaded area; injecting a plastic material into the zone; and separating the surfaces, the separating resulting in a rotation of the article with respect to the surfaces by coaction of the deformation with the article. In still another aspect, this invention relates to a molded plastic article comprising an annual cylindrical tube, one cylindrical surface of the tube having a threaded area thereon, and the other cylindrical surface of the tube having a helical deformation thereon, the axes of the threaded area and the helical deformation corresponding substantially with each other and with the axis of the tube.

In the past, molding of threaded plastic objects has posed the problem of removing the molded object from the mold. There have been generally two methods used for removing such an item from the mold. In the first, the object is simply physically pulled or "stripped" from the mold; this often results in a deformation or destruction of the molded threads as they are forced over the threaded portion of the mold. In the second, the mold is provided with a rotating threaded mold portion which is mechanically unscrewed from the molded article after molding. This latter method results in a very expensive mold, and poses the additional problem of sealing the rotating portion of the mold against leakage of molten plastic under injection pressure.

It is an object of this invention to provide method and apparatus for molding threaded plastic articles wherein parting of the mold sections automatically causes an unscrewing of the molded article from the threaded portion of the mold. It is another object of this invention to provide method and apparatus for molding a threaded article wherein removal of the molded article from the mold is facilitated. It is still another object of this invention to provide a molded threaded article which is easily removed from its mold.

Other aspects, objects, and advantages of the present invention will become apparent from a study of the disclosure, the claims appended thereto, and the drawings in which: FIGURE 1 is a section of a mold incorporating one embodiment of our invention; FIGURE 2 is a view of the molded object produced by the mold of FIGURE 1; FIGURE 3 is a section of a mold incorporating another embodiment of our invention; FIGURE 4 is a view of the molded object produced by the mold of FIGURE 3; and FIGURE 5 is a view, partially in section, of a mold incorporating another embodiment of our invention.

We have now discovered that a threaded article can be removed from its mold by imparting to the article a rotation through coaction of helical deformations on the article and corresponding deformations in the mold. We have further discovered that stripping of a threaded article from its mold is facilitated by an initial partial unthreading of the article from the mold. Thus, there is provided a two-step removal of the article from the mold; first, a partial unthreading effected by coaction of helical ribs or grooves on the article and corresponding grooves or ribs on the mold and caused by a parting of the mold sections; and, second, either a stripping or a complete unthreading of the article from the mold. There is further provided a molded article which is readily removed from a threaded mold by reason of its being rotated on the threaded mold upon parting of the mold sections.

In order to further explain our invention, reference is now made to the drawings, and to FIGURE 1 in particular. In FIGURE 1 is shown a three-part mold comprised of die portions 1, 2 and 3. In practice, portion 1 is usually held stationary, while portions 2 and 3 are free to slide laterally on rails not shown. In portion 1 is provided a nozzle receiving cup 4 adapted to receive the nozzle of a plastic injection machine, not shown. Sprue passage 4a leads from cup to runners 5, which can be provided in corresponding faces of either or both die portions 1 and 2. The runners are provided with gate portions 6 and 6', and terminate in mold cavities 7 and 7'. These mold cavites are provided according to the invention with helical grooves 8 and 8' in their walls. These grooves are pitched such that, when molding a bottle cap as shown, each groove traverses up to about ¼ to ⅜ of a revolution through its length. Die portion 3 is provided with cavities 9 and 9', extensions of cavities 7 and 7', and have central thereof threaded male portions 10 and 10'. Referring now to FIGURE 2, there is shown a bottle cap such as is formed by the mold of FIGURE 1. The body of the cap 11 has molded integrally thereon ribs 12, helically pitched, as shown, resulting from grooves 8 in FIGURE 1. The parting line between mold portions 2 and 3 is shown as dotted line 13. The interior of cap 11 is provided with threads 14 formed by male member 10 of FIGURE 1. In operation, mold portions 1, 2 and 3 are pressed tightly together, and plastic material is forced by way of nozzle cup 4, sprue passageway 4a, runners 5, and gates 6 and 6' into cavities 7 and 7'. After the plastic has gained sufficient structural strength, either by cooling in the case of a thermoplastic resin or by curing in the case of a thermosetting resin, mold portion 3 is pulled away from mold portions 1 and 2. Because of the pitch of grooves 8 and 8' and corresponding ribs 12, the body of the caps 11 are rotated, causing a partial unthreading of caps 11 from male members 10 and 10'. The caps 11, severed at gates 6 and 6' from the runner 5, can now either be pulled off members 10 and 10' or unthreaded therefrom. In either instance, it has been found that removal is much easier by virtue of their having been partly unthreaded. Mold portion 2 is then pulled from mold portion 1. Ejection of the sprue and runner assembly follows. The molded object can also be removed, after having been partially unthreaded by the method of this invention, by use of stripping rods, one of which is shown at 25. These rods are slideably disposed in mold section 3 at suitable spacing and are arranged to be contacted by a fixed means, not shown, so as to cause final ejection of the molded article as mold section 3 is moved toward the right, as is known in the art.

Referring now to FIGURE 3, there is shown another embodiment of our invention. There is utilized here a two-part mold, portion 15 normally being stationary and portion 16 being free to slide laterally on rails not shown. Nozzle cup 17 and sprue passageway 17a connect to runners 18 and, thence, to mold cavities 19 and 19'. These cavities are provided with helical grooves 20 and 20'. Movable mold 16 is provided with male threaded portions 21 and 21'. FIGURE 4 shows an article, here again a bottle cap, produced by the mold of FIGURE 3. The body of cap 22 is provided with ribs 23, helically pitched as shown, resulting from grooves 20 and 20' in FIGURE 3. The interior of cap 22 is provided with threads 24 formed by male mold members 21 and 21' of FIGURE 3. In operation, mold portions 15 and 16 are pressed tightly together, and plastic material is forced from an injection machine not shown by way of nozzle cup 17, sprue passageway 17a, runners 18 and into cavities 19 and 19'. After the plastic has gained sufficient structural strength, mold portions 15 and 16 are separated. This results in rotation of the molded articles and a partial unthreading from male members 21 and 21'. As explained in conjunction with FIGURES 1 and 2, the rotation of the molded articles is caused by the pitch of ribs 23 in conjunction with grooves 20 and 20'. The molded bottle caps can now either be pulled off members 21 and 21' or unthreaded therefrom.

Referring now to FIGURE 5, there is shown a two-part mold designed to produce threaded-top jars for such as cold creams, jellies, medications, etc., or male plug-type threaded closures. The operation of this mold is similar to that of FIGURE 1, portion 27 being movable on rails not shown and portion 26 being stationary. Nozzle cup 28 and sprue passageway 28a are provided in portion 26. A single mold cavity 29 having threads 30 is provided in portion 26; sprue passageway 28a allows flow of plastic into the cavity. The mold portion 27 is provided with male member 32 having helical grooves 31 therein. It is thus seen that the article produced by this mold will have exterior threads and interior helical ribs which serve to effect the partial unthreading desired.

In some instances, it is desirable that the helical deformations in the molded article be grooves rather than raised ribs. As is evident from the drawings, the invention is equally applicable to two-part and three-part molds, and to single or multiple cavity molds.

According to an example of our invention, a mold is fabricated as shown in FIGURE 1. Polyethylene is injected by an injection molding machine. After allowing the bottle caps to cool sufficiently to gain mechanical strength, the mold sections are parted. The caps are rotated about ¼ turn by the parting of the mold portions; the caps can then be readily removed either by "stripping" them off the male member or by unscrewing them.

As will readily be seen, the pitch of the helical ribs will determine the amount of unthreading caused by parting of the mold portions. It is generally desirable that this rotation be substantially less than one complete revolution, i.e., about ⅛ turn to about ½ turn. However, where the threaded portion is relatively long, greater rotation is possible.

In some instances, the runners, such as item 5 in FIGURE 1, are provided with surrounding heating means, not shown, which maintain the polymer therein in a molten state between injection shots. This obviates the need of removing and scrapping a runner for each cycle. In such instances, the mold portion, such as item 2 in FIGURE 1, need not be separated from mold portion item 1 except for occasional cleaning.

In the specification and claims, the use of terminology such as oblique deformation "helical ribs" and "helical deformation" will be understood by one skilled in the art to encompass not only the geometrically precise configuration of the helix, which is a presently preferred embodiment, but also such ribs or deformations on the cylindrical surface of the molded object as will coact with the corresponding ribs or deformations in the mold to produce a moving or rotation of the molded article with respect to the mold upon parting of the mold sections.

Reasonable variation and modification are possible within the scope of our invention as set forth in the disclosure, drawings, and claims appended thereto, the essence of which is that there are provided method and apparatus for removing a threaded article from its mold by coaction of helical deformations on the article and corresponding deformations in the mold, and there is further provided a molded article readily removable from its mold.

We claim:

1. The method of molding a threaded article in a separable mold zone which comprises molding on an unthreaded surface of said article a helical rib, the longitudinal axis of the helix corresponding with the longitudinal axis of the thread and the pitch directions of said helix and said thread being opposite; and parting the mold sections of said molding zone so as to cause rotation of said article with respect to the molding surfaces of said surfaces by coaction of said rib and a deformation on the molding surface of one of said sections.

2. The method of molding a threaded article which comprises providing a molding zone defined by an inner and an outer surface, one of said surfaces having a threaded area thereon and the other of said surfaces having a helical deformation thereon, the longitudinal axis of said helix corresponding with the longitudinal axis of the threaded area and the pitch directions of said helix and said threaded area being opposite; injecting a plastic material into said zone; and separating said surfaces, said separating resulting in a rotation of said article with respect to said surfaces by coaction of said deformation with said article.

3. An apparatus for molding a threaded article comprising a female mold cavity and a male mold member designed to coact with said cavity to define a space corresponding to said article, one of said cavity and said member having a threaded area thereon, and the other of said cavity and said member having a longitudinal helical deformation thereon, the axis of said threaded area corresponding with the axis of said helical deformation, the pitch directions of said helical deformation and said threaded area being opposite, and both of said axes being substantially perpendicular to the surface between said cavity and said member whereby a threaded article molded in said space coacts with said helical deformation to effect at least a partial unthreading of said article from said threaded area upon parting of said cavity and said member.

4. An apparatus for molding a threaded article comprising a female mold cavity having a helical deformation thereon, a male mold member having a threaded area thereon, said cavity and said member when in an engaged position coacting to define a space corresponding to said article, the axis of said helical deformation corresponding with the axis of said threaded area and the pitch directions of said helical deformation and said threaded area being opposite, both of said axes being substantially perpendicular to the surface between said cavity and said member, means for supplying molten plastic to said space, and means for separating said cavity and said member from said engaged position whereby a threaded article molded in said space coacts with said helical deformation to effect at least a partial unthreading of said article from said threaded area upon separation of said cavity from said member.

5. An apparatus for molding a threaded article comprising a male mold member having a helical deformation thereon, a female mold cavity having a threaded area thereon, said cavity and said member when in an engaged position coacting to define a space corresponding to said article, the axis of said helical deformation corresponding with the axis of said threaded area and the pitch directions of said helical deformation and said threaded area being opposite, both of said axes being substantially perpendicular to the surface between said cavity and said member, means for supplying molten plastic to said space, and means for separating said cavity and said member from said engaged position whereby a threaded article molded in said space coacts with said helical deformation to effect at least a partial unthreading of said article from said threaded area upon separation of said cavity from said member.

6. The method of molding a threaded article in a separable molding zone which comprises molding on an unthreaded surface of said article an oblique deformation, the pitch direction of said deformation being opposite that of the threaded area, and parting the molding surfaces of said molding zone so as to cause rotation of said article with respect to said molding surfaces.

7. An apparatus for molding a threaded article comprising a female mold cavity and a male mold member designed to coact with said cavity to define a space corresponding to said article, one of said cavity and said member having a threaded area thereon, and the other of said cavity and said member having an oblique deformation thereon, the axis of said threaded area being substantially perpendicular to the surface between said cavity and said member, and the pitch direction of said deformation being opposite that of said threaded area, whereby parting of said cavity from said member effects at least a partial unthreading of said article from said threaded area by coaction of said article with said deformation.

8. The method of molding a threaded article in a separable mold zone which comprises molding on a surface of said article a helical deformation having a longitudinal axis substantially identical with that of the threaded portion and having a pitch direction opposite that of said threaded portion, the pitch of said helical deformation being relatively steep in comparison to the pitch of the threads of said article and parting the mold surfaces of said molding zone whereby said helical deformation coacts with the corresponding deformation in said molding zone to effect a rotation of and at least a partial unthreading of said article from said molding zone.

References Cited in the file of this patent

UNITED STATES PATENTS

| | | |
|---|---|---|
| 1,916,692 | Scribner | July 4, 1933 |
| 2,155,316 | Lauterbach | Apr. 18, 1939 |
| 2,808,620 | Schmid et al. | Oct. 8, 1957 |
| 2,850,194 | Williams | Sept. 2, 1958 |
| 2,899,705 | Darlington | Aug. 18, 1959 |
| 2,915,211 | Ryan | Dec. 1, 1959 |
| 2,984,862 | Chabotte | May 23, 1961 |